United States Patent
Dreyfus

(10) Patent No.: US 8,440,059 B2
(45) Date of Patent: May 14, 2013

(54) ELECTROLYTIC CELL FOR OBTAINING ALUMINIUM

(75) Inventor: Jean-Michel Dreyfus, Lyons (FR)

(73) Assignee: Carbone Savoie, Venissieux (FR)

( * ) Notice: Subject to any disclaimer, the term of this patent is extended or adjusted under 35 U.S.C. 154(b) by 975 days.

(21) Appl. No.: 12/299,338

(22) PCT Filed: Apr. 25, 2007

(86) PCT No.: PCT/FR2007/000698
§ 371 (c)(1),
(2), (4) Date: Nov. 3, 2008

(87) PCT Pub. No.: WO2007/125195
PCT Pub. Date: Nov. 8, 2007

(65) Prior Publication Data
US 2009/0218216 A1    Sep. 3, 2009

(30) Foreign Application Priority Data

May 3, 2006 (FR) ...................... 06 03937

(51) Int. Cl.
*C25C 3/08* (2006.01)
*C25C 3/06* (2006.01)

(52) U.S. Cl.
USPC ............... 204/247.4; 204/243.1; 204/247.5; 205/354; 205/372; 205/379

(58) Field of Classification Search ........... 204/243.1, 204/247.4
See application file for complete search history.

(56) References Cited

U.S. PATENT DOCUMENTS

| | | | | |
|---|---|---|---|---|
| 3,110,660 A | * | 11/1963 | Miller | 204/247.5 |
| 3,302,999 A | | 2/1967 | Mitchell | |
| 4,175,022 A | * | 11/1979 | Vadla et al. | 204/247.4 |
| 4,276,246 A | | 6/1981 | Bonzom et al. | |
| 4,442,165 A | * | 4/1984 | Gebhardt et al. | 428/307.7 |
| 4,556,468 A | * | 12/1985 | Peterson et al. | 204/247.5 |
| 4,589,967 A | | 5/1986 | Etzel | |
| 4,737,254 A | | 4/1988 | Gesing et al. | |
| 5,582,695 A | * | 12/1996 | Olsen | 204/279 |

FOREIGN PATENT DOCUMENTS

| | | |
|---|---|---|
| CN | 1151450 | 6/1997 |
| EP | 0132647 A | 2/1985 |
| EP | 1344846 A | 9/2003 |
| GB | 1007864 A | 10/1965 |

(Continued)

OTHER PUBLICATIONS

International Search Report dated Jun. 11, 2008 (PCT/FR07/00698); ISA/EP.

(Continued)

*Primary Examiner* — Harry D Wilkins, III
*Assistant Examiner* — Bryan D. Ripa
(74) *Attorney, Agent, or Firm* — Banner & Witcoff, Ltd.

(57) ABSTRACT

The invention relates to an electrolytic cell for obtaining aluminum, including a pot shell, at least one cathode block arranged at least partially in the pot shell, at least one anode suspended above the cell and dipping into the upper portion of the electrolytic cell, and an insulation at least partially covering the internal surface of the pot shell and located between the cathode block and the pot shell, the pot shell and the elements that it contains delimiting a crucible intended to receive an electrolytic bath in contact with the cathode block, characterized in that the insulation is at least partially made of carbon-based blocks having a heat conductivity lower than 1 W/m/K.

8 Claims, 1 Drawing Sheet

FOREIGN PATENT DOCUMENTS

| | | |
|---|---|---|
| RU | 2191223 | 10/2002 |
| RU | 2266983 | 12/2005 |
| WO | 2006/017348 A | 2/2006 |

OTHER PUBLICATIONS

French Search Report dated Jan. 8, 2007 (FR0603937); SA/FR.
Curtis E L et al: "Light Metals, The Utilization of Composite Carbon-Silicon Carbide Sidewall Blocks in Cathodes" Light Metals 1996. Proceedings of the Technical Sessions Presented by the TMS Light Metals Committee at the 125th. TMS Annual Meeting, Anaheim, Feb. 4-8, 1996; [Proceedings of the TMS Annual Meeting], Warrendale, TMS, US, vol. MEETING 125, Jan. 1, 1996, pages.
English Translation of Written Opinion from PCT/FR2007/000698 dated Jun. 11, 2008.
Serlie et al., Cathodes in Aluminium Electrolysis, 2nd edition, publication, pp. 126-141, Nov. 10, 2010, Alu Media GmbH, Germany.

\* cited by examiner

ELECTROLYTIC CELL FOR OBTAINING ALUMINIUM

This invention relates to an electrolytic cell for obtaining aluminium.

FIG. 1 describes an electrolytic cell 1 classically used for aluminium electrolysis. It comprises:
- a steel external shell, called a pot shell 2,
- an insulation 3, placed inside of the pot shell 2, composed of a layer of insulating bricks 4 and a layer of refractory bricks 5, protecting the base and running up a portion of the sides of the pot shell 2, as shown more specifically in FIG. 2,
- a cathode 6 formed by a plurality of cathode blocks made of carbon or graphite, arranged in the base of the pot shell 2 and equipped with current collector bars 7,
- carbon- or silicon carbide-based side slabs 8, placed at the level of the upper lateral portion of the pot shell 2, at the level of the electrolysis bath, and intended to dissipate the heat energy,
- lining paste 9 forming a seal between the insulation 3 and/or the side slabs 8, and the cathode 6,
- a crucible delimited by the elements contained by the pot shell 2 and intended to receive the electrolysis bath 10,
- an anode 11 constituted by at least one carbonaceous block, suspended above the pot shell 2 and intended to be in contact with the electrolysis bath in an operative position of the cell 1.

More specifically, the layer of insulating bricks 4 is generally composed of one or more sub-layers of insulating bricks, each with a thickness of 65 mm. Similarly, the layer of refractory bricks 5 is generally composed of one or more sub-layers of refractory bricks, each with a thickness of around 65 mm.

The electrolysis bath is composed primarily of molten cryolite ($Na_3AlF_6$ or $3NaF—AlF_3$) or sodium aluminium fluoride. Depending on the production requirements, additions of sodium fluoride (NaF) or aluminium fluoride ($AlF_3$) are provided in order to modify the composition of the bath. Other additives can also be used ($CaF_2$, LiF, . . . ).

In the electrolysis, liquid aluminium 12 is formed on the surface of the cathode 6 in contact with the electrolytic bath. The current successively passes through the anode 11, the electrolytic bath, the aluminium 12, and the cathode 6 and leaves the cell by the current collector bars 7.

To produce aluminium, alumina ($Al_2O_3$) is added to the electrolytic bath so as to obtain liquid aluminium 12. This, under the effect of gravity, is deposited on the cathode 6.

The liquid aluminium 12 thus produced is periodically removed from the cell 1, and the bath is regularly supplied with alumina.

As the temperature of the bath is maintained by the Joule effect, associated with the passage of the current, between around 950° C. and 975° C., it is necessary to insulate the assembly using insulating bricks 4, arranged against the internal surface of the pot shell, and refractory bricks 5, located between the insulating bricks 4 and the cathode blocks 6.

This insulation 3 provides both the heat insulation and the electrical insulation necessary for operation of the electrolytic cell 1.

This insulation can be degraded according to two processes.

The first occurs when heating and using a new cell. A poor seal of the crucible is associated with openings and cracks that may appear at the level of the cathode 6 and/or the lining paste 9. These passages enable the electrolyte and the liquid aluminium to pass under the cathode blocks 6, to reach the insulation 3 at the base of the cell 1, and then to rapidly degrade this insulation 3.

This first degradation mechanism occurs very quickly after the cell is first started up. It can be avoided by a careful arrangement of the seal of lining paste 9 around the cathode 6, preheating adjusted so as to take into account the baking of the lining paste, and a start-up enabling the seal of the crucible to be preserved.

The second degradation process occurs during normal operation of the cell, when components of the electrolytic bath, in particular fluorides and sodium, penetrate, through the cathode blocks 6, into the insulation 3.

This mechanism is a long-term ageing phenomenon and is inherent to the electrolytic cell technology as described above.

The penetration phenomenon of the bath into the cathode 6 is described in detail below.

The book "Cathodes in aluminium electrolysis", Aluminium-Verlag ISBN 3-87017-230-4, 1994 p. 127, M. Sorlie and H. A. Oye teaches that the carbon is not wetted by the liquid aluminium and is difficult to wet with the molten fluorides. Thus, even with a high porosity or permeability, the penetration of the bath into the cathode remains difficult, as it is made of carbon or graphite.

Such a penetration of the bath remains possible only after diffusion of the sodium (Na) in the cathode. However, this sodium diffusion results from the following reaction:

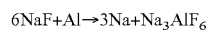

$$6NaF + Al \rightarrow 3Na + Na_3AlF_6$$

The sodium diffusion, i.e. the movement of the reaction toward the right, is promoted by a strong electric polarisation necessary for the electrolytic process.

The sodium is thus caused to diffuse by intercalation in the carbonaceous matrix of the cathode, i.e. in its structure and/or its porosities.

This diffusion by intercalation causes an expansion of the cathode blocks and initiates the penetration of the electrolytic bath by wetting and capillarity in the carbonaceous matrix.

A solidification of the bath by cooling generates mechanical compression stresses capable of causing cracks in the cathode blocks. To avoid such a phenomenon, the solidification isotherm of the bath, on the order of 888° C. for this type of bath, is voluntarily placed under the cathode blocks so as to make sure that the entire electrolytic bath penetrating the cathode remains in liquid form.

The liquid electrolytic bath passes through the cathode and comes into contact with the insulation 3 at the base of the cell, directly under the cathode 6.

Due to certain reactions that will not be described in detail here, the composition of the bath penetrating the cathode is enriched with sodium fluoride.

The bath then reacts with the materials used to form the insulating layer. The sodium and the fluorides of the bath attack both the silica and the alumina contained in the insulating 4 and refractory 5 bricks forming the insulation 3. In addition, the liquid aluminium reacts with the silica of these bricks. Finally, certain other components of the electrolytic bath, such as lithium fluoride or calcium fluoride, react with the insulation 3 and also with the metal pot shell 2, so that they are deteriorated.

The degradations of the insulating layer reduce the heat insulation properties and cause compression stresses since the products of reaction of the bath with the insulation have a larger volume than the materials used originally to form the insulation.

These stresses cause a vertical thrust of the cathode blocks, directed upward, as well as a compression of the insulation material.

The upward thrust of the cathode blocks causes them to bend, which can eventually cause them to break.

The compression of the insulation material causes an increase in its heat conductivity and thus contributes to a reduction in the heat insulation. Such a degradation of the heat insulation properties makes it more difficult to control the temperature of the electrolytic bath and causes cooling of the cathode, thus allowing solid sludge to appear on its surface in contact with the bath.

All of these phenomena cause a reduction in the efficiency of the cell and a deterioration thereof.

In addition, the presence of fluorides from the bath in the insulation presents environmental problems when disassembling dead cells, as the products from the disassembly are intended for landfills. Indeed, fluorides such as sodium fluoride (NaF), originally in the electrolytic bath, are water-soluble and can be carried by surface runoff.

It is therefore necessary to passivate this waste by costly treatments so as to be able to dispose of it safely.

To overcome this problem, various materials have been used to form anti-penetration barriers 13 intended to prevent, reduce or retard the transport of sodium, aluminium and the electrolytic bath toward the insulating layer.

The anti-penetration barriers 13 are generally arranged between the cathode blocks 6 and the layer of refractory bricks 5 forming a portion of the insulation 3 at the base of the cell 1, as shown more specifically in FIG. 2.

The article "Penetration barriers in the cathode of Hall-Héroult cells", Aluminum, 68, n1, Jahrgang 1992 p. 64, K. Grjotheim and H. Kvande, presents in particular the advantages and disadvantages of the various techniques used.

Thus known anti-penetration barriers are produced using:
steel plates,
graphite sheets,
refractory bricks and tiles,
powders containing alumina or not,
glass,
refractory concrete.

The use of steel plates provides good protection against sodium, but such plates are attacked by the other components of the electrolytic bath.

The graphite sheets make it possible to provide excellent protection against the migration of cryolite, its breakdown products and components of the bath, but remains ineffective against sodium. This is why graphite sheets are generally combined with steel plates.

Nevertheless, such a combination does not make it possible to provide heat and electrical insulation under the cathode blocks. It is then necessary to use insulation below the anti-penetration barrier thus formed, generally in the form of small bricks.

The use of refractory bricks and tiles remains the most commonly used technology. However, while this type of barrier prevents the penetration of liquid products, it does not provide protection against the diffusion of solid fluorides. These can thus pollute the delining products, i.e. the products resulting from the removal of the dead cell wall coatings.

In addition, the use of small bricks or tiles generally requires the placement of some thousands of elements to form the insulation of a single cell.

A classic cell normally requires the placement of 10,000 bricks with a size on the order of 65×110×220 mm and a density substantially equal to 2 g/cm$^3$ for the densest, forming an insulating layer of around 20 tons.

Aside from the high weight, the implementation time for placing the bricks and joining them is very high.

As regards the use of powders, it remains dangerous since these pulverulent products transmit fine particles when they are positioned. In addition, it remains complex, as the layer of powder must be subjected to at least one step of vibration inside the cell so as to increase the densification of the layer.

Moreover, a poor initial densification leads to the appearance of cavities under the cathode, due to vibrations of the cell during its operation, and these cavities are eventually filled with the molten electrolysis bath at high temperature.

Furthermore, even if the conductivity of the vibrated powder layer remains acceptable, it deteriorates significantly after reaction with the bath.

As regards the use of glass, this forms with the molten bath an extremely viscous and therefore impermeable mixture. However, non-viscous products such as oxyfluoride silicate can be formed and alter the efficacy of the treatment.

Finally, the use of refractory concrete in the cell requires a mixing step using specific mixers, a step of vibration of the material in the cell and a heat treatment step for drying. The use of such an insulation therefore remains relatively complex.

Thus, the various techniques mentioned above make it possible to fight, often in an incomplete or complex manner, against the degradation of the insulating layer and against the migration of fluorides.

It also remains necessary to combine a plurality of layers of different materials in order to satisfy the twofold requirement of protection of the insulating layer and heat insulation of the cell.

The objective of this invention is therefore to propose an insulation that is hot degraded by the electrolysis bath, making it possible to prevent or reduce the migration of fluorides, satisfying the required heat insulation conditions, and that is not complex to produce.

To this end, the invention relates to an electrolysis cell for obtaining aluminium, including:
a pot shell,
at least one cathode block arranged at least partially in the pot shell,
at least one anode, suspended above the cell and dipping into the upper portion of the electrolysis path,
an insulation at least partially covering the internal surface of the pot shell 2 and located between the cathode block and the pot shell,
the pot shell and the elements that it contains delimiting a crucible intended to receive an electrolytic bath in contact with the cathode block,
characterised in that the insulation is at least partially made of carbon-based blocks having a heat conductivity lower than 1 W/m/K.

Due to the presence of collector bars, no current passes into the area located under the cathode blocks. This area, in contact with the insulation located at the base of the cell, is thus not subjected to electric polarisation.

As seen above, the lack of electric polarisation prevents the diffusion of sodium in the carbon insulation thus formed. It also prevents the formation of solid aluminium under the cathode, which can be formed only by cathode reduction.

However, the presence of aluminium and electric polarisation are two elements necessary for diffusion of sodium in a carbonaceous matrix, as explained above and as appears in the aforementioned chemical reaction. As the diffusion of sodium is necessary for the penetration of the electrolytic bath into the carbon-based blocks forming the insulation, the latter remain impermeable to the electrolytic bath.

Thus, under the cathode blocks, where no current passes, because the electric potential is constant, the insulating layer cannot be degraded.

In addition, the placement of such an insulation remains relatively simple since no vibration step or preliminary treatment inside the cell is necessary.

Finally, the heat conductivity of the insulation blocks makes it possible to provide temperature stability of the cell and control the electrolytic process.

According to a feature of the invention, the carbon-based insulating blocks have a density between 0.03 and 0.8 g/cm$^3$, and preferably between 0.1 and 0.6 g/cm$^3$.

The low volume density of the blocks ensures a low weight of the insulating layer, which can brought down to 4 tons, by comparison with a classic insulating layer of 20 tons, produced using bricks. This low volume density also makes it possible to obtain good heat resistance.

The heat conductivity of the carbon-based blocks is preferably lower than 0.3 W/m/K.

Advantageously, the carbon-based blocks are made in the form of slabs with a size on the order of 120×440×880 mm.

This size makes it possible to obtain a good compromise between the ease of handling of the various blocks and the placement of the insulation.

The use of such blocks also makes it possible to considerably reduce the number of elements forming the insulating layer since only 310 blocks are necessary, instead of the 10,000 bricks used to form a classic insulation.

The thickness, while imposed by the minimum heat resistance of the insulation, is relatively low, which makes it possible to increase the volume of the electrolytic bath or the thickness of the cathode block.

According to a feature of the invention, the junction between the slabs is produced using carbonaceous glues or carbonaceous cements.

The seals thus formed resist, like the carbon-based blocks, attacks by the various components of the bath.

The blocks are preferably based on carbonaceous foam.

The use of foam makes it possible to simplify the production while producing blocks having the desired properties, both in terms of resistance and thermal properties.

In any case, the invention can be better understood with the following description, in reference to the appended diagrammatic drawings showing, by way of non-limiting examples, a number of embodiments of this electrolytic cell.

Figure 1:
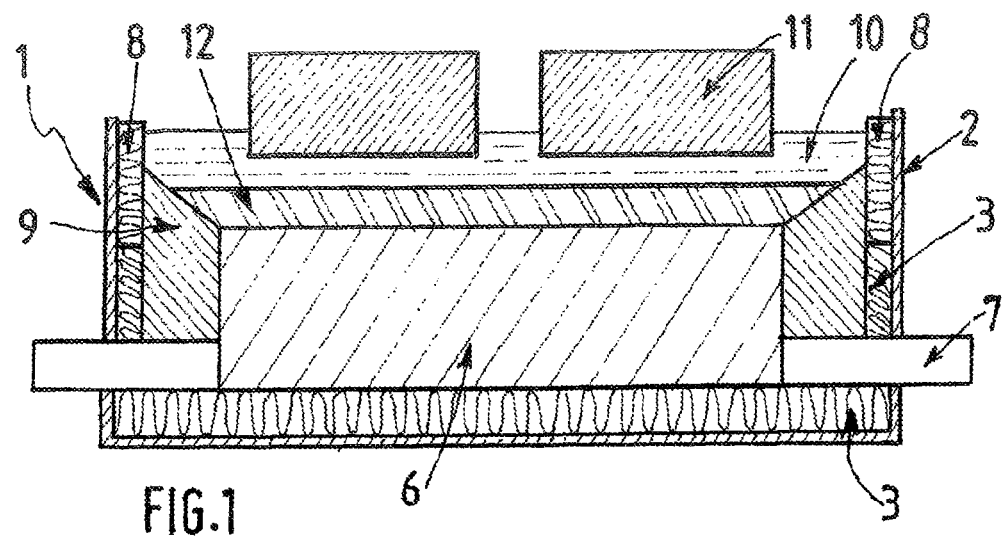
FIG. 1 is a transverse cross-section view of an electrolytic cell according to the prior art.
Figure 2:
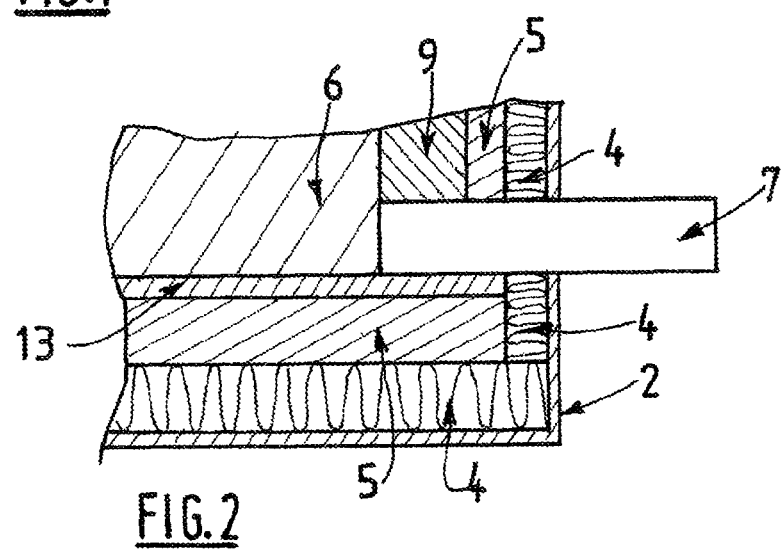
FIG. 2 is an enlarged view of the insulating part of the cell.
Figure 3:
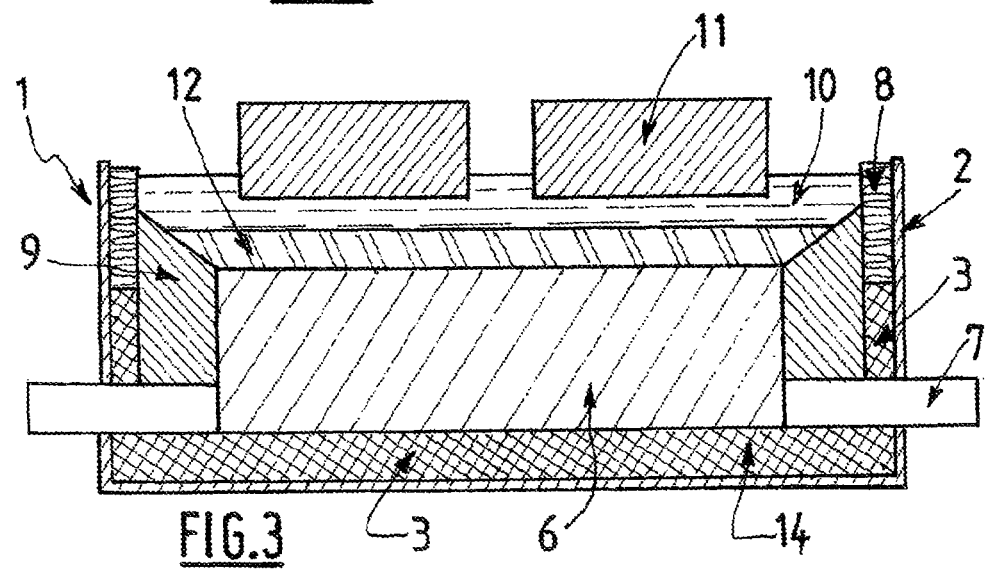
FIG. 3 is a view corresponding to FIG. 1, of an electrolytic cell according to the invention.

The elements designated by references 1 to 12 relating to FIG. 3 are, for the remainder of the description, identical to those designated by the same references in FIGS. 1 and 2.

FIG. 3 shows an electrolytic cell according to the invention. This cell differs essentially from the cell of the prior art discussed in the preamble in that the insulation 3 is no longer formed by a set of insulating 4 and refractory 5 bricks and an anti-penetration barrier 13, but by carbon-based blocks 14 with a low heat conductivity.

These blocks 14 are, for example, based on carbonaceous foam of which the heat conductivity is lower than 1 W/m/K, and preferably lower than 0.3 W/m/K and of which the density is lower than 0.8 g/cm$^3$, and preferably lower than 0.6 g/cm$^3$.

The blocks, for example, have a thickness on the order of 120 mm, a width of 440 mm and a length of 880 mm.

Seals made of carbon-based glue or cement enable a sealed connection to be formed between the blocks, which seal does not react with the products contained in the electrolytic bath.

Such cements are known to a person skilled in the art and correspond to the cements used to produce the seals between the various side slabs.

The blocks 14 forming the insulation 3 can also be insulated from the cathode blocks 6 by a layer of alumina or another pulverulent product or by a layer of lining paste. This layer can facilitate the placement of the cathode blocks and their alignment in the cell.

According to another possible embodiment, the insulation 3 is formed by two layers of insulating bricks, each having a thickness of 65 mm, covered by a layer of blocks with a thickness of 130 mm.

If the insulating bricks and the blocks have heat conductivities respectively equal to 0.15 W/m/K and 0.30 W/m/K, the heat resistance of the insulation is substantially equal to 1300 (arbitrary unit—a.u.).

For purposes of comparison, the resistance of a classic insulation constituted by two layers of classic insulating bricks covered by two layers of classic refractory bricks, wherein each of the four layers has a thickness of 65 mm, is around 985 a.u.

As shown in the previous results, the replacement of two layers of refractory bricks with a layer of blocks having an equivalent thickness makes it possible to improve the heat resistance of the insulation by around 30%.

According to another embodiment, a classic heat resistance of 985 a.u. can be obtained by using two layers of insulating bricks as described above, covered by a layer of blocks having a thickness substantially equal to 36 mm, which blocks have a heat conductivity of 0.30 W/m/K, as above.

It is noted that, in this case, the same heat resistance can be obtained with an insulation of 166 mm rather than 260 mm.

Such a reduction in the thickness of the insulation 3 makes it possible to increase the thickness of the cathode blocks 6 or to increase the volume of the electrolytic bath.

The use of a single layer of carbon-based blocks 14, with a thickness substantially equal to 197 mm and a heat conductivity equal to 0.2 W/m/K makes it possible to obtain a heat resistance equivalent to the classic insulations, i.e. substantially equal to 985 a.u.

Such a heat resistance can also be obtained with a layer of blocks 14 having a thickness substantially equal to 148 mm and a heat conductivity equal to 0.15 W/m/K.

The strong heat resistance enables the insulation of the cell 1 to be conveniently ensured.

As is clear from the values cited above, such blocks have heat conductivities equivalent to those of the insulating bricks and lower than those of the refractory bricks.

In addition, the carbon-based blocks are inert to aluminium and to the electrolytic bath insofar as they are not passed through by en electric current, as seen above.

Indeed, the blocks are not subjected to the electrical flow due to their positioning with respect to the cathode 6 and their high electrical resistivity, which is associated with the low heat conductivity.

Moreover, the use of blocks of such a size makes it possible to form the insulation using around 310 blocks, while the insulation of the cell of the prior art mentioned above is composed of around 10,000 bricks. It is easy to understand that, due to the low weight and the size of the blocks 14, the assembly of the cell 1 is significantly facilitated.

In addition, the lightening of the insulation layer to be depolluted and the low contamination by fluorides make it possible to reduce the costs of depollution and landfill disposal when delining the dead cell.

It goes without saying that the invention is not limited to the single embodiment of this system described above by way of an example, but rather encompasses all variations. Thus, in particular, the carbon-based blocks are not necessarily constituted by a foam base, but can be made of a carbon-based material having similar thermal properties.

The invention claimed is:

1. Electrolytic cell for obtaining aluminium, comprising:
a pot shell,
at least one cathode block arranged at least partially in the pot shell above a base of the pot shell,
at least one anode, suspended above the cell and configured to dip into an upper portion of the electrolytic cell,
an insulation at least partially covering the internal surface of the base of the pot shell and located below the cathode block and between the cathode block and the pot shell,
the pot shell and the elements that it contains delimiting a crucible intended to receive the electrolytic bath in contact with the cathode block,
wherein the insulation is at least partially made of carbon-based blocks having a heat conductivity lower than 1 W/m/K and wherein the carbon-based blocks are in contact with the internal surface of the base of the pot shell.

2. Electrolytic cell for obtaining aluminium according to claim 1, wherein the carbon-based blocks have a density between 0.03 and 0.8 $g/cm^3$.

3. Electrolytic cell for obtaining aluminium according to claim 1, wherein the heat conductivity of the carbon-based blocks is lower than 0.3 W/m/K.

4. Electrolytic cell for obtaining aluminium according to claim 1, wherein the carbon-based blocks are made in the form of slabs with a size on the order of 120×440×880 mm.

5. Electrolytic cell for obtaining aluminium according to claim 4, wherein the junction between the slabs is produced with carbonaceous glues or carbonaceous cements.

6. Electrolytic cell for obtaining aluminium according to claim 1, wherein the blocks are based on carbonaceous foam.

7. Electrolytic cell for obtaining aluminium according to claim 1, wherein the carbon-based blocks have a density between 0.1 and 0.6 $g/cm^3$.

8. Electrolytic cell for obtaining aluminium according to claim 1, further comprising current collector bars connected to the cathode and extending from the cathode through opposed sides of the pot shell.

* * * * *